United States Patent
Gan et al.

(10) Patent No.: US 10,607,040 B1
(45) Date of Patent: Mar. 31, 2020

(54) AUTOMATED FORM FILL

(71) Applicant: MOTOROLA SOLUTIONS, INC, Chicago, IL (US)

(72) Inventors: Guo Dong Gan, Kuala Lumpur (MY); Yen Hsiang Chew, Bayan Lepas (MY); Jin Hoe Phua, Chenderiang (MY); Tejeash Duraimanickam, Lunas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/281,182

(22) Filed: Feb. 21, 2019

(51) Int. Cl.
  *G06F 17/00* (2019.01)
  *G06F 40/174* (2020.01)
  *G06F 16/78* (2019.01)
  *G06K 9/00* (2006.01)
  *G06F 40/169* (2020.01)

(52) U.S. Cl.
  CPC ........ *G06F 40/174* (2020.01); *G06F 16/7867* (2019.01); *G06F 40/169* (2020.01); *G06K 9/00671* (2013.01)

(58) Field of Classification Search
  CPC .............................. G06F 17/241; G06F 17/243
  See application file for complete search history.

(56) References Cited

U.S. PATENT DOCUMENTS

| | | | |
|---|---|---|---|
| 7,426,496 B2 | 9/2008 | Kristjansson | |
| 8,396,286 B1 | 3/2013 | Ardhye et al. | |
| 2012/0144286 A1* | 6/2012 | Bank | G06F 17/241 715/230 |
| 2013/0033522 A1* | 2/2013 | Calman | G06Q 30/0633 345/633 |
| 2013/0226578 A1* | 8/2013 | Bolton | H04N 21/4758 704/235 |
| 2013/0262588 A1* | 10/2013 | Barak | H04L 67/22 709/204 |
| 2013/0326552 A1* | 12/2013 | Adams | H04N 21/234 725/14 |
| 2017/0262421 A1 | 9/2017 | Yue | |
| 2019/0108419 A1* | 4/2019 | Coven | G06N 20/00 |

OTHER PUBLICATIONS

Huang et al., "An Event-based Video Retrieval System by Combining Broadcasting Baseball Video and Web-casting Text," copyright 2011 ACM, SAC' 11, p. 846-852. (Year: 2011).*

* cited by examiner

*Primary Examiner* — Amelia L Tapp

(57) ABSTRACT

A method and apparatus for annotating video is provided herein. During the process of annotating a video, important text within a form is identified. Annotations are placed within the video that are related to the important text within the form. In addition to annotating the video with important text taken from the form, Information that is determined based on the text, may be taken from the video in order to help fill the form.

11 Claims, 4 Drawing Sheets

AUTOMATED FORM FILL

RELATED APPLICATIONS

The present application is related to U.S. application Ser. No. 16/281,199, entitled, VIDEO ANNOTATION, filed on the same day as the present application and assigned to the same assignee as the present application.

BACKGROUND OF THE INVENTION

Annotations within video can help viewers identify important elements within a video. Unfortunately, many times video comprises annotations that are not related to information that a user is searching for. This leads to wasted time viewing video and reading annotations in search of information. For example, consider the situation where after a traffic accident, a public-safety officer has collected videos from multiple sources (Body worn camera, CCTV, etc.). If an investigator wants to look through all of the videos to find the needed information, it would be beneficial if only relevant annotations are present. It would also be beneficial if the video could somehow aide in providing information to complete a report or help to fill out a form.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
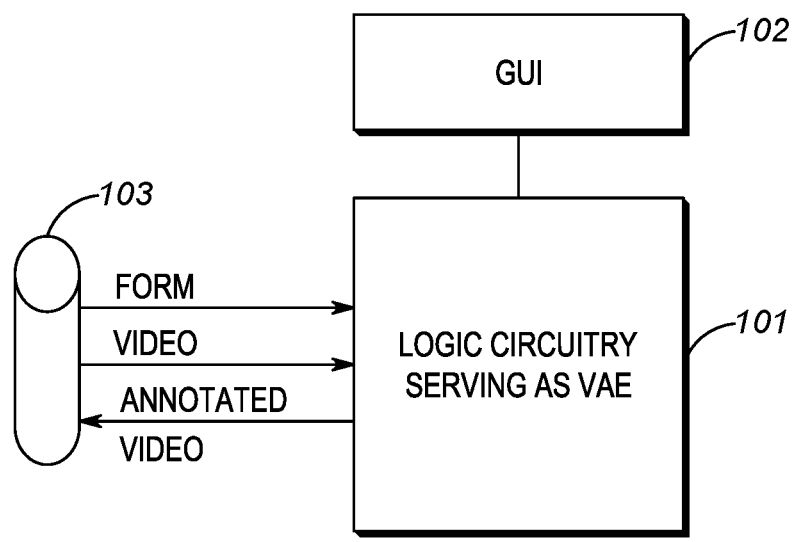
FIG. 1 is a block diagram of a device for annotating images/video.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for annotating video is provided herein. During the process of annotating a video, important text within a form is identified. Annotations are placed within the video that are related to the important text within the form.

In addition to annotating the video with text related to the important text taken from the form, information may be taken from the video in order to help fill the form. The information taken is related to the important text within the form.

Expanding on the above, when a user opens a particular type of form (traffic report form, crime report form, . . . , etc.), particular text within the form will be identified and used as an input to a recognition engine (sometimes referred to as a video analysis engine (VAE)). The recognition engine may then determine a location within a video of any object, scene, location, . . . , etc. related to the particular text. The video may then be annotated with the particular text identified within the form (other text related to the particular text may be used to annotate as well). The video may comprise body worn camera (BWC) video, street surveillance camera video, and/or any other video recorded and/or stored.

Once an object, scene, location, . . . , etc. related to the particular text is identified (and possibly annotated), the object, scene, location, . . . , etc. related to the particular text will be analyzed for various characteristics related to the particular text (e.g., eye color, height, make, model, . . . , etc.). If the various characteristics related to the particular text are able to be determined from the analyzed video, a form field may then be populated with the determined characteristics. In one embodiment of the present invention, only form fields that have not been previously filled in will be populated.

Consider the following example: Officer John needs to write a report about a car accident he handled during the day. The accident report is opened, and contains various fields, one of which is "make" and "model" of the "automobile involved in the accident". Once the report is open, the particular text "model" and "make" and "automobile involved in the accident" will be identified and fed to logic circuitry which will engage a particular video analysis engine that is related to the particular text (e.g., an automobile video analysis engine). All video taken during the investigation will be analyzed using the video analysis engine to determine if an automobile can be identified, and if so, its location within the video is also determined. Once identified, the video will be annotated so that the identified automobile will have text related to the particular text (e.g., "automobile involved in accident") placed nearby. If identified, the automobile will also have the particular text "model" and "make" annotated near the identified automobile.

The video may also be annotated with fields that have been previously filled within the form. For example, if Officer John has already filled out a field for the make and model of the vehicle, then these fields may be used for annotating the video such that the make and model of the vehicle are used to annotate the video appropriately.

In one embodiment of the present invention, the video is annotated with only user-filled information within the form. In another embodiment, text that is related to the particular text is used for annotation. For example, if a form contained the words "weapon used", then a video analysis engine used to identify weapons may be used to analyze the video, and the word "potential weapon" may be used to annotate any weapon identified. If, however, the form was previously filled by a user, where "potential weapon" was identified (filled) as knife, then in one embodiment, only knifes will be identified with the video analysis engine, and only knifes will be annotated with the word "knife".

If the make and model of the vehicle has not been previously filled out by Officer John, then after possible annotation, the video analysis engine will be utilized to determine the "model" and "make" of the vehicle. Once determined, the form will be populated accordingly.

It should be noted that the text input into the video analysis engine is taken directly from a form. Different forms will result in different inputs into the video analysis engine. In fact, different forms may even result in different video analysis engines being run on a particular video. This allows for any form to be used to annotate video and also to allow for the form to be populated by the video analysis engine.

FIG. 1 is a block diagram of apparatus 100 for annotating video and populating a form with information from a video. The apparatus may be located within a dispatch center, police radio, or any other device capable of analyzing and annotating video as described. As shown, apparatus 100 comprises microprocessor (logic circuitry) 101 that also serves to execute a video analysis engine (VAE), Graphical User Interface (GUI) 102, and storage 103. Although only one GUI 102 is shown in FIG. 1, multiple GUIs may be present. GUI 102 provides a man/machine interface for receiving an input from a user and displaying information. For example, GUI 102 may provide a way of conveying (e.g., displaying) information received from processor 101. Part of this information may comprise annotated video. In order to provide the above features (and additional features), GUI 102 may comprise any combination of a touch screen, a computer screen, a keyboard, or any other interface needed to receive a user input and provide information to the user.

Logic circuitry 101 comprises a digital signal processor (DSP), general purpose microprocessor, a programmable logic device, or application specific integrated circuit (ASIC) and is configured to annotate video (which may be stored in storage 103 or received from elsewhere) as described above. In order to determine objects within any video/image, logic circuitry 101 may execute a recognition engine/video analysis engine (VAE) which comprises a software engine that analyzes analog and/or digital video. The particular software engine being used can vary, and is stored in storage 103. In one embodiment, various video-analysis engines are stored in storage 103, each serving to identify a particular object (car, weapon, person, . . . , etc.). In another embodiment of the present invention, a single video-analysis engine is utilized.

Using the software engine, logic circuitry 101 is able to "watch" video and detect/identify pre-selected objects. The video-analysis engine may contain any of several object detectors as defined by the software engine. Each object detector "watches" the video for a particular type of object. For example, automobile object detector software may be utilized to detect automobiles, while a fire detection software may be utilized to detect fires. On detecting a particular object, logic circuitry 101 may identify the object as related text taken from a form, and annotate it accordingly.

Database 103 comprises standard memory (such as RAM, ROM, . . . , etc.) and serves to store forms, video, and software engines.

During operation a user instructs logic circuitry 101 via GUI 102 to select a particular form/report stored in storage 103. Video(s) may be selected as well. With the form and the video(s) selected, the user will instruct logic circuitry 101 to perform video annotation as described above. For example, logic circuitry 101 will analyze the form to determine various text/keywords. Text/keywords may be extracted from various header or sub-header fields of a form. Once the various text/keywords are determined from the form, logic circuitry 101 will determine what to search for in the video based on the various text/keywords, and choose an appropriate video-analysis engine.

As is evident, words from a form are mapped to a particular video-analysis engine by logic circuitry 101, and the particular video-analysis engine is loaded and executed by logic circuitry 101. The mapping process preferably comprises an operation that associates each element of a given set (the domain) with one or more elements of a second set (the range). The form text comprises the domain, while the video-analysis engine comprises the range. The mapping may be explicit based on predefined rules, or the mapping may be trained via neural network modeling.

Logic circuitry 101 will maps particular text within a form to relevant video-analysis engines. More specifically, if an particular word x is an element of a group of possible words X (i.e., x∈X), we say that f "takes the value" or "maps to" f(x) at x. The set X is called the domain of the function f. The set of possible outcomes of f(x) (possible video-analysis engines) is called the range. For example, y=F(x), where y is the range (video-analysis engine) and x is the domain (word chosen from a form) such that.

Video-Analysis Engine Chosen=Function(word chosen from a form).

Logic circuitry 101 may use various software engines in order to detect the text/keywords within the video. As discussed, this will allow logic circuitry 101 to "watch" video and detect objects/scenes, . . . , etc. related to the text/keywords. For example, text/keyword of "weapon" may be pulled from the form, causing logic circuitry 101 to scan the video(s) for any weapons, and annotate them accordingly (e.g., "potential weapon", "knife", "gun", . . . , etc.). This is illustrated in FIG. 2.

Figure 2:
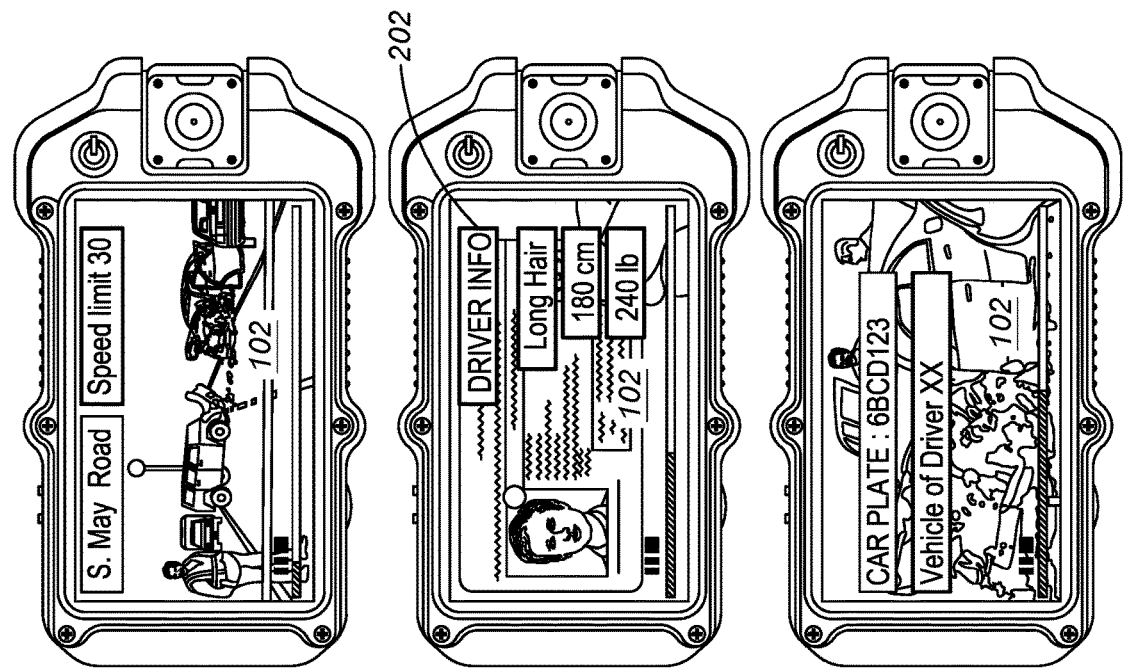
FIG. 2 illustrates an annotation of a video.
Figure 2:
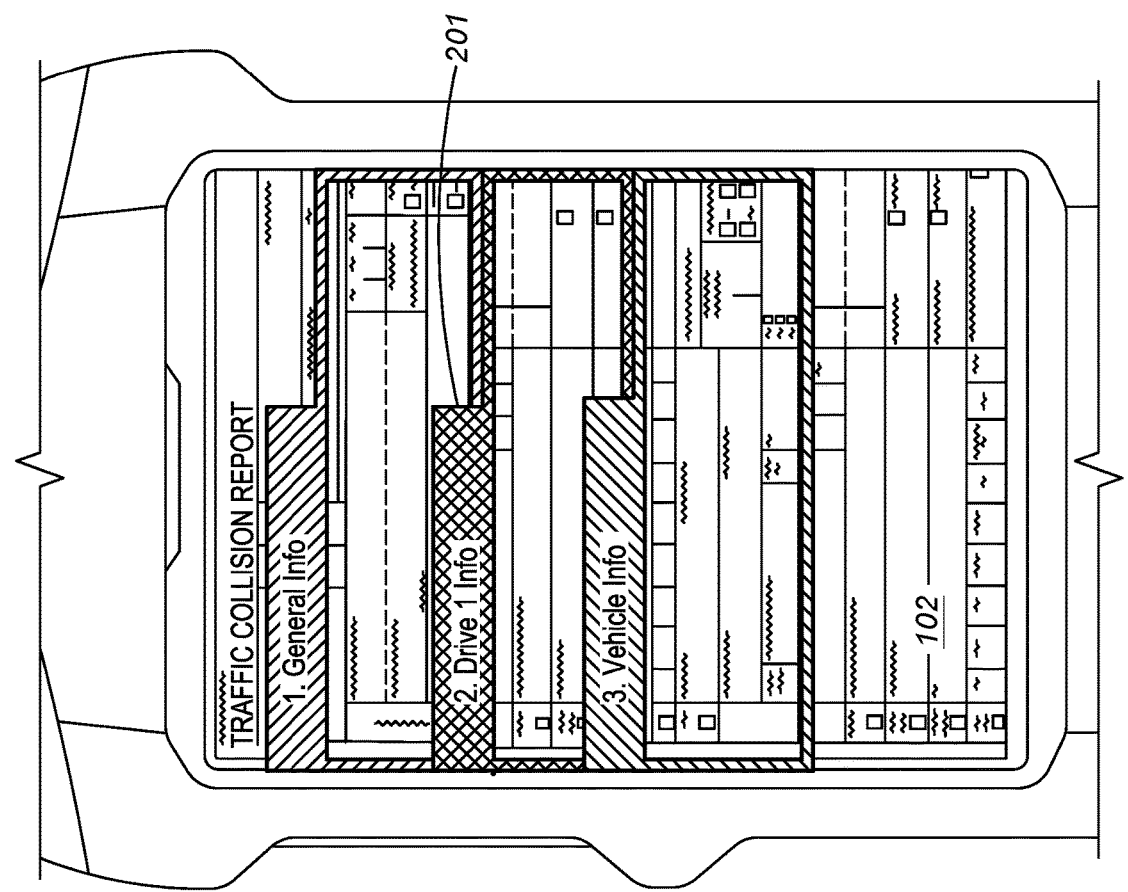

FIG. 2 illustrates multiple GUIs 102. The multiple GUIs 102 may comprise the same GUI showing different forms/videos at different times, or alternatively may comprise multiple GUIs 102 showing all items simultaneously, or any combination thereof. As shown in FIG. 2, GUI 102 displays form 201 which has text such as "general info", "driver 1 info", "vehicle info", . . . , etc. This causes logic circuitry 101 to annotate video accordingly. More particularly, annotation 202 is added to the video that comprises "driver info". As shown, other annotation is added as well ("speed Limit 30", "long hair", "180 cm", . . . , etc.). As discussed this annotation is based on text/keywords contained within form 201.

In determining what information from form 201 to use for annotating video, logic circuitry 101 may utilize all text from form 201 in annotating the video, or only a portion of the text shown in form 201. For example, only text of a certain font, location (e.g., header, sub-header), size, color, orientation, location . . . , etc. may be utilized when annotating video. So for example, logic circuitry 101 may utilize only text having a font size above a predetermined threshold (e.g., 18 pt), or having a particular font "Times New Roman", or having an orientation of vertical or within a predetermined location (e.g. top section) . . . , when determining what text from form 201 is to be used to determine a video-analysis engine and annotate video. Alternatively, logic circuitry 101 may use filled fields (presumably filled by a user) as text/keywords to use for choosing a video-analysis engine and annotation of video.

When annotating video, apparatus 100 is configured to provide memory 103 containing a form and at least one video. (It should be noted that multiple memories may be included, one comprising the form, and another comprising video). The form comprises a digital document (e.g., Microsoft Word document, Adobe document, Rich Text document, . . . , etc.) with blank spaces for insertion of required or requested information. Some of the "blank" spaces may be filled in by a user. A user typically types in information within the blank spaces. Logic circuitry is provided and configured to access the form and the video, determine keywords from the form, perform video analysis on the video in order to determine a position within the video related to the keywords, and annotate the video at the position with text related to the keywords.

The logic circuitry is also configured to store the annotated video within memory 103. As discussed, logic circuitry 101 may determine keywords from the form by determining user-inserted information within the form. For example, if a user filled in a blank space on the form with information, the information may be used as keywords by logic circuitry 101 to choose a video-analysis engine and annotate video accordingly.

In addition to the above, logic circuitry 101 may determine the keywords from the form by associating keywords with text having a certain font, location, size, color, location, and/or orientation. For example, all headers may be considered keywords, and/or all N-level sub-headers of a header may be considered keywords. Keywords may comprise exact text taken from the form (for example an exact header), so for example, if the form comprises text that states "Date", a keyword may comprise "Date". Keywords may also comprise text derived from the form (for example a text derived from a header), so for example, keywords such as "location" may be derived from text that states "Incident address". Keywords may also comprise synonyms or words with relatively similar meaning to a text or a sentence taken from the form.

Logic circuitry 101 performs video analysis by utilizing a software engine that is based on the keywords. As discussed, the software engine is designed to find video related to the particular keyword. So, for example, if the keyword is "License Plate", the software engine is designed to find video related to "License Plate". This video may comprise all license plates contained within the video.

Figure 3:
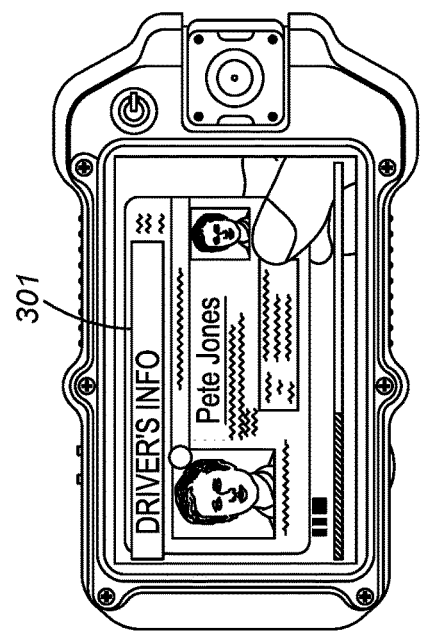
FIG. 3 illustrates utilizing information from a video to complete a form.
Figure 3:
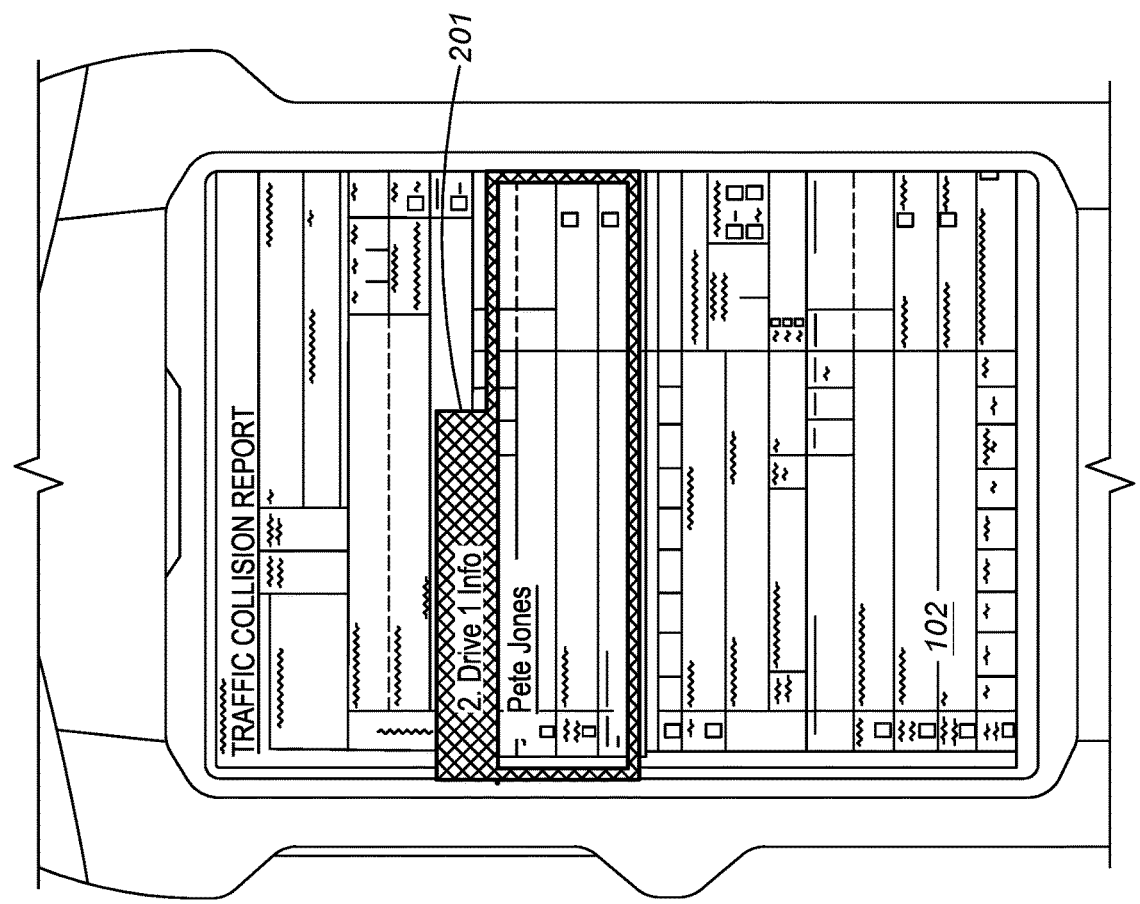

As discussed above, video may also be used to fill form 201. This is illustrated in FIG. 3. As shown in FIG. 3, "driver 1 info" is text within form 201, resulting in video to be annotated with "driver's info" 301. Also shown in FIG. 3, the name "Pete Jones" has been detected by logic circuitry 101 within the video as part of a driver's license. The name "Pete Jones" is then populated into form 201 appropriately. As discussed above, in one embodiment of the present invention only fields that have not been previously populated are automatically populated by logic circuitry 101.

With the above in mind, apparatus 100 comprises memory 103 storing a form, wherein the form comprises a document with blank spaces for insertion of required or requested information. Memory also stores video. Logic circuitry 101 is configured to access the form and the video, determine keywords based on text within the form, perform video analysis on the video in order to determine a position within the video related to the keywords, and determine information within the video related to the keywords. Once the information is determined, logic circuitry fills a blank space (field) within the form with the information. The form with the filled space may be stored in memory 103.

Figure 4:
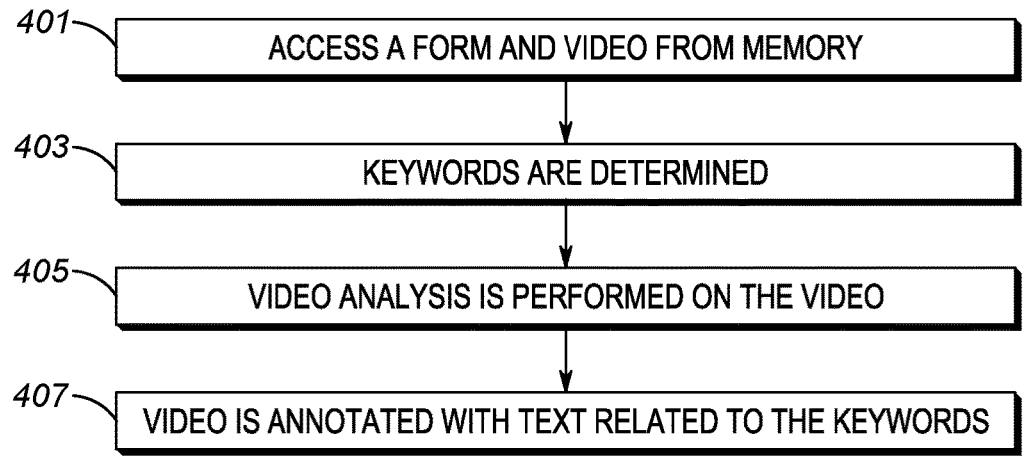
FIG. 4 is a flow chart showing operation of the device of FIG. 1.

FIG. 4 is a flow chart showing operation of the apparatus of FIG. 1. More particularly, the steps shown in FIG. 4 shows those steps (not all necessary) for device 100 to annotate video as described above. The logic flow begins at step 401 where logic circuitry 101 accesses a form and video from memory. As discussed, the form comprises a digital document with blank spaces for insertion of required or requested information. Keywords are then determined based on text within the form (step 403) and video analysis is performed on the video (step 405). As discussed, the video analysis determines a position within the video related to the keywords. Finally, at step 407 the video is annotated. As discussed above, the video is annotated at the position, with text related to the keywords.

It should be noted that there may exist a step between 403 and 405 where a video analysis engine is chosen (via mapping as discussed above) and loaded from memory based on the keywords.

As discussed above, the step of determining keywords may comprise the step of determining user-inserted information within the form. Additionally, the step of determining keywords may comprise the step of associating keywords with text within the form having a certain font, location, size, color, and/or orientation. The keywords may comprise actual text taken from the form, for example, text inserted by a user to fill the form.

As discussed above, memory 103 may comprise software engines that are tailored for finding specific items within video. The step of performing video analysis may comprise utilizing a software engine that is chosen based on the keywords.

Figure 5:
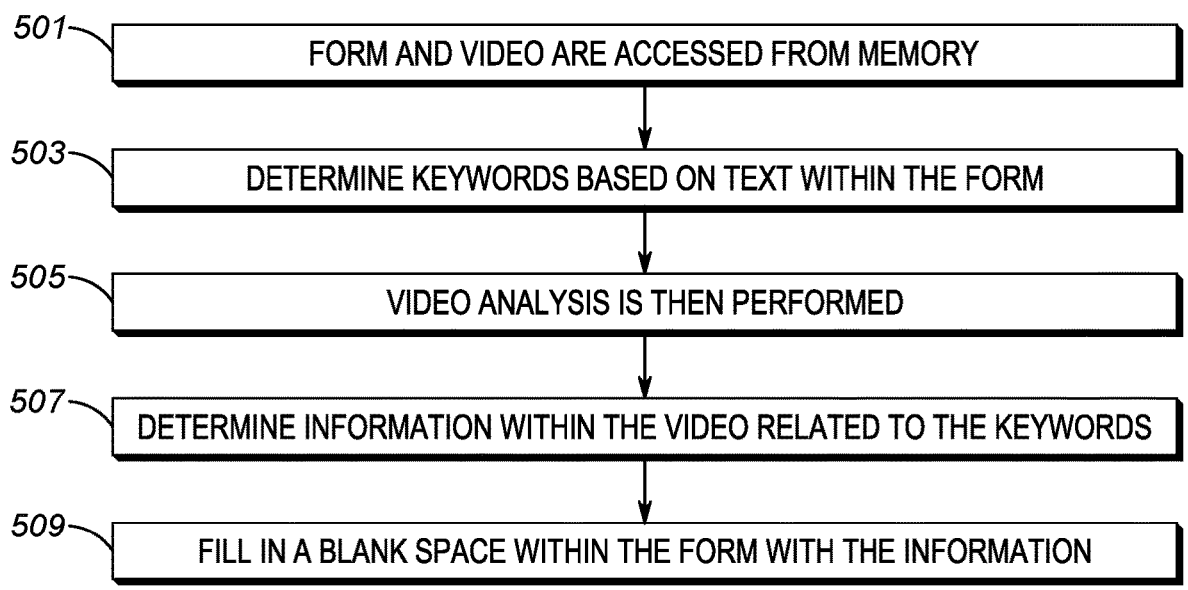
FIG. 5 is a flow chart showing operation of the device of FIG. 1.

FIG. 5 is a flow chart showing operation of the apparatus of FIG. 1. More particularly, the steps shown in FIG. 5 shows those steps (not all necessary) for device 100 to fill information into a form based on video analysis. The logic flow begins at step 501 where the form and video are accessed from memory. The logic flow then continues to step 503 where logic circuitry 101 determines keywords based on text within the form.

Video analysis is then performed by logic circuitry 101 at step 505. As discussed above, the video analysis determines a position within the video related to the keywords. As discussed above, this step may entail logic circuitry 101 accessing memory 103 to access a particular software engine based on the keyword. So for example, a first keyword will cause logic 101 circuitry to utilize a first software engine, while a second keyword will cause logic circuitry 101 to utilize a second software engine.

At step 507, logic circuitry 101 acts as a video analysis engine (possibly using a retrieved software engine) to determine information within the video related to the keywords. Finally, at step 509 logic circuitry 101 fills in a blank space within the form with the information. The video may also be annotated as described above.

As an example of the above, consider the following example: Officer John needs to write a report about a car accident he handled during the day. The accident report is opened, and contains various fields, one of which is "make" and "model" of the "automobile involved in the accident". Once the report is open, the particular text "model" and "make" and "automobile involved in the accident" will be identified. A particular video-analysis engine may be chosen with the particular text fed to the video analysis engine. All video taken during the investigation will be analyzed to determine if an automobile can be identified, and if so, its location within the video. Once identified, the automobile will be analyzed by a video analysis engine based on its "make" and "model". If the "make" and "model" are recognized within the video with a high confidence score and text results are generated, the particular fields, "make" and "model" will be filled in based on the result generated from the video analysis engine of the identified automobile.

The video may also be annotated with fields that have been automatically filled within the form by the above method. For example, if the video analysis engine has recognized the "make" and "model" and has already filled out a field for the make and model of the vehicle, then the make and model of the vehicle are used to annotate the video at a position within the video where the vehicle is located.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for inserting text into a form, the method comprising the steps of:
   accessing the form and video from memory, wherein the form comprises a document with blank spaces for insertion of required or requested information;
   determining keywords based on text within the form;
   performing video analysis on the video, wherein the video analysis determines a position within the video related to the keywords;
   determining information within the video related to the keywords;
   filling in a blank space within the form with the information; and
   wherein the step of determining keywords comprises one or both of the following:
      determining user-inserted information within the form; or associating keywords with text within the form having a certain font, location, size, color, and/or orientation.

2. The method of claim 1 further comprising the step of: annotating the video at the position with text related to the keywords.

3. The method of claim 2 wherein the step of annotating the video comprises the step of annotating the video with the text taken from the form.

4. The method of claim 1 wherein the step of performing video analysis comprises the step of utilizing a software engine that is based on the keywords.

5. The method of claim 1 wherein the keywords comprise text taken from the form, or text derived from the form.

6. An apparatus comprising:
memory storing a form, wherein the form comprises a document with blank spaces for insertion of required or requested information;
memory storing video;
logic circuitry configured to:
  access the form and the video;
  determine keywords based on text within the form;
  perform video analysis on the video in order to determine a position within the video related to the keywords exists;
  determine information within the video related to the keywords; and
  fill a blank space within the form with the information;
wherein the logic circuitry determines keywords from the form by determining user-inserted information within the form.

7. The apparatus of claim 6, wherein the logic circuitry is also configured to annotate the video at the position with text related to the keywords.

8. The apparatus of claim 7, wherein the logic circuitry is also configured to store the annotated video within the memory.

9. The apparatus of claim 6 wherein the logic circuitry performs video analysis by utilizing a software engine that is based on the keywords.

10. The apparatus of claim 6 wherein the keywords comprise text taken from the form, or text derived from the form.

11. An apparatus comprising:
memory storing a form, wherein the form comprises a document with blank spaces for insertion of required or requested information;
memory storing video;
logic circuitry configured to:
  access the form and the video;
  determine keywords based on text within the form;
  perform video analysis on the video in order to determine a position within the video related to the keywords exists;
  determine information within the video related to the keywords; and
  fill a blank space within the form with the information;
wherein the logic circuitry determines the keywords from the form by associating keywords with text having a certain font, location, size, color, and/or orientation.

* * * * *